United States Patent
Sun et al.

(10) Patent No.: US 11,222,296 B2
(45) Date of Patent: Jan. 11, 2022

(54) COGNITIVE USER INTERFACE FOR TECHNICAL ISSUE DETECTION BY PROCESS BEHAVIOR ANALYSIS FOR INFORMATION TECHNOLOGY SERVICE WORKLOADS

(71) Applicant: International Business Machines Corporation, Armonk, NY (US)

(72) Inventors: Hongtan Sun, Armonk, NY (US); Maja Vukovic, New York, NY (US); Karin Murthy, Elmsford, NY (US); Raghav Batta, Ossining, NY (US); Soumitra Sarkar, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/145,820

(22) Filed: Sep. 28, 2018

(65) Prior Publication Data
US 2020/0104774 A1    Apr. 2, 2020

(51) Int. Cl.
*G06Q 10/06*    (2012.01)
*H04L 12/24*    (2006.01)
(Continued)

(52) U.S. Cl.
CPC ....... *G06Q 10/06393* (2013.01); *G06F 17/18* (2013.01); *G06N 20/00* (2019.01); *H04L 41/5067* (2013.01)

(58) Field of Classification Search
None
See application file for complete search history.

(56) References Cited

U.S. PATENT DOCUMENTS 8,731,994 B2    5/2014 Kass et al.
9,459,950 B2    10/2016 Bhamidipaty et al.
(Continued)

FOREIGN PATENT DOCUMENTS

CN    103164649 A    6/2013
CN    106156362 A    11/2016

OTHER PUBLICATIONS

Applying the power of Azure Machine Learning to improve SAP incident management; May 31, 2018; ; (Year: 2018).*
(Continued)

*Primary Examiner* — Deirdre D Hatcher
(74) *Attorney, Agent, or Firm* — Cantor Colburn LLP; Abdy Raissinia

(57) ABSTRACT

Aspects of the invention include receiving, using a processor, a plurality of values of a performance indicator. A statistical analysis of the plurality of values of the performance indicator is performed, using the processor, to detect an anomaly pattern in the plurality of values of the performance indicator. A warning message about the detected anomaly pattern is sent to an alert recipient that is selected by a machine learning model trained to identify alert recipients based at least in part on detected anomaly patterns. Feedback about the warning message is received from the alert recipient. The feedback includes an interest of the alert recipient in receiving warning messages about the detected anomaly pattern. The machine learning model is updated based at least in part on the feedback.

20 Claims, 8 Drawing Sheets

(51) Int. Cl.
*G06F 17/18* (2006.01)
*G06N 20/00* (2019.01)

(56) References Cited

U.S. PATENT DOCUMENTS

| | | | |
|---|---|---|---|
| 2003/0046382 A1* | 3/2003 | Nick | G05B 9/02 |
| | | | 709/224 |
| 2007/0006122 A1* | 1/2007 | Bailey | G06F 8/61 |
| | | | 717/101 |
| 2012/0131172 A1 | 5/2012 | Falk et al. | |
| 2013/0198116 A1* | 8/2013 | Bhamidipaty | H04L 41/5074 |
| | | | 706/12 |
| 2014/0180738 A1* | 6/2014 | Phillipps | G06Q 10/0635 |
| | | | 705/7.12 |
| 2015/0033077 A1 | 1/2015 | Bhamidipaty et al. | |
| 2015/0200815 A1 | 7/2015 | Verkasalo | |
| 2016/0205127 A1 | 7/2016 | Roehl et al. | |
| 2017/0279669 A1 | 9/2017 | Tapia et al. | |
| 2017/0322534 A1* | 11/2017 | Sinha | G05B 19/0426 |
| 2017/0372231 A1* | 12/2017 | Ghatage | G06Q 10/0631 |
| 2018/0240152 A1* | 8/2018 | Mookherjee | G06Q 30/0256 |
| 2018/0373234 A1* | 12/2018 | Khalate | G06N 20/00 |
| 2019/0087746 A1* | 3/2019 | Jain | G06Q 30/016 |
| 2019/0268214 A1* | 8/2019 | Maes | G06K 9/6263 |

OTHER PUBLICATIONS

Demystifying Machine Learning And Anomaly Detection; 2016 (Year: 2016).*
Less is more in incident categorization; Silva et al; 2018 (Year: 2018).*
Machine Learning and ITSM: Helping Help Desks; Jul. 24, 2017 (Year: 2017).*
Sipos, et al., "Log-based predictive maintenance", Proceedings of the 20th ACM SIGKDD international conference on knowledge discovery and data mining, 2014, pp. 1867-1876.
Sun et al. Using Domain Knowledge for Targeted Alerting in PBA for IT Service Management, IEEE, 2018, 6 pages.

* cited by examiner

```
INPUTS: A SET W_train OF k_1 WARNING MESSAGES WITH USER'S FEEDBACK. A SET W_test OF k_2 WARNING MESSAGES
WITHOUT USER'S FEEDBACK. PBA ANALYSIS DIMENSION d, i.e. THE NUMBER OF k_1 WARNING MESSAGES
PBA ENGINE. n_j NUMBER OF WARNING TYPES FOR DIMENSION i, j = 1,2,...,d. θ: VECTOR OF CONTROL THRESHOLD.

NAÏVE-BAYES-BASED MODEL TRAINING:
  FOR j=1,2,...,Σ_{j=1}^d n_j do
    x_j ← VECTOR REPRESENTATION FOR THE jth WARNING MESSAGE IN W_train. x_j[s] = j IF THE sth DIMENSION HAS
          TYPE j WARNING AND 0 IF THE sth DIMENSION IS UNDER CONTROL, FOR s = 1,2,...,d.
    z_j ← VECTOR REPRESENTATION IF THE jth WARNING MESSAGE IN W_train. x_j[s] = j IS DETERMINED TO BE USEFUL
          AND 0 IF THE sth DIMENSION IS UNDER CONTROL OR THE MESSAGE IS DETERMINED TO BE NOT USEFUL,
          FOR s = 1,2,...,d.
  END FOR.
  NN ← NAÏVE-BAYES MODEL TRAINED ON {(x_j,y_j), i = 1,2,...,k1}.

ISSUE DETECTION:
  FOR i = 1,2,..., k_2 DO
    x_i ← VECTOR REPRESENTATION FOR THE ith WARNING MESSAGE IN W_test, X_i[s] = j IF THE sth DIMENSION HAS
          TYPE j WARNING AND 0 IF THE sth DIMENSION IS UNDER CONTROL, FOR s = 1,2,...,d.
    p_i ← NN. PREDICT (x_i), THE VECTOR OF INDICATORS THAT x_i IS USEFUL.
    FOR s = 1,2, ...,d AND x_i[s]>0 do
      IF p_i[s] > θ[s], do
        GENERATE MESSAGE "BASED ON JOINT ANALYSIS WITH D CATEGORIES, THERE IS A HIGH
          CHANCE OF SYSTEM-LEVEL ISSUE RELATES TO THIS WARNING."
      END IF
    END FOR
  END IF
END FOR
```

COGNITIVE USER INTERFACE FOR TECHNICAL ISSUE DETECTION BY PROCESS BEHAVIOR ANALYSIS FOR INFORMATION TECHNOLOGY SERVICE WORKLOADS

BACKGROUND

The present invention generally relates to monitoring information technology (IT) systems, and more specifically, to a cognitive system and user interface for technical issue detection by process behavior analysis (PBA) for IT service workloads.

Different monitoring systems that track metrics such as server availability, central processing unit (CPU) usage, and available storage capacity have been implemented to track the performance of individual IT systems. System-level assessment and service performance control of IT systems still require manual data analytics and investigation by domain experts, or subject matter experts (SMEs). The technical background of the members of a technology service team can vary and some of the domain experts may be relied on more often than others to identify and resolve possible system issues. In an IT service delivery organization, personnel from different competencies (e.g., delivery analysts, monitoring experts, and automation experts) constantly monitor various aspects of service delivery quality and efficiency. The monitoring is performed to detect any anomalous behavior, and to launch investigations to identify and remove any actual or potential defects in the IT environment in a timely manner. Organizations are continuously striving to improve service quality and efficiency and thus, determining what constitutes anomalous system behavior is continually changing over time. In addition, the SMEs who should be alerted when different types of anomalous behavior is detected also changes over time as job assignments and areas of interest evolve.

SUMMARY

According to one or more embodiments of the present invention, computer-implemented methods for technical issue detection by process behavior analysis (PBA) for information technology (IT) service workloads is provided. A non-limiting example computer-implemented method includes receiving, using a processor, a plurality of values of a performance indicator. A statistical analysis of the plurality of values of the performance indicator is performed, using the processor, to detect an anomaly pattern in the plurality of values of the performance indicator. A warning message about the detected anomaly pattern is sent to an alert recipient that is selected by a machine learning model trained to identify alert recipients based at least in part on detected anomaly patterns. Feedback about the warning message is received from the alert recipient. The feedback includes an interest of the alert recipient in receiving warning messages about the detected anomaly pattern. The machine learning model is updated based at least in part on the feedback.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts pseudo code for a machine learning model according to one or more embodiments of the present invention;

FIG. 8 depicts a user interface screen for feedback collection according to one or more embodiments of the present invention.

Figure 1:
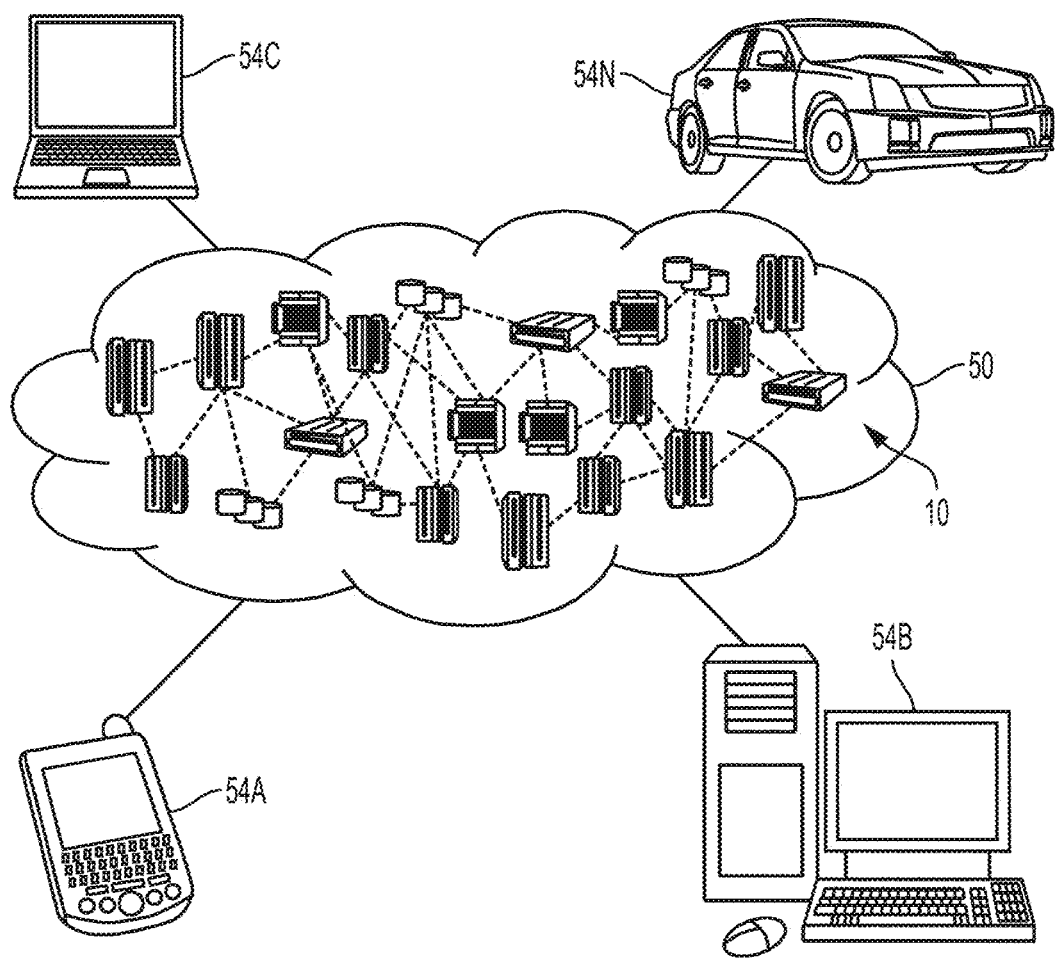
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention use a statistical quality control method, such as process behavior analysis (PBA), to automatically detect technical issues in an information technology (IT) environment based at least in part on IT service management data. In addition, alerts related to the technical issues are generated and machine learning is utilized to select target recipients of the alerts. One or more embodiments of the present invention provide alerts about the detected technical issues to domain experts and collect feedback about the alerts from the domain experts. The feedback about the alerts is used to improve the automated routing of the alerts and may also be used to improve the automated issue detection. In addition, the feedback may be used to educate the domain experts. Examples of a domain experts, or subject matter experts (SMEs), include but are not limited to enterprise architects, project executives, account managers, and technical health managers.

In accordance with one or more embodiments of the present invention, an IT service workload is assessed periodically from various aspects, and PBA is performed to identify unusual time-series behaviors. PBA is an example of a known statistical quality control method that monitors aspects of a process, using key performance indicators (KPIs) that reflect each aspect, and that flags any deviations from the process as abnormal behavior. Once an abnormal process behavior is identified, warning messages are generated for the unusual behavior and sent to users (e.g., SMEs) through a plug-in interface of the user's daily working environment and the users can investigate if the messages indicate some technical issues. User feedback is collected and used to update the machine learning model. In addition, the user feedback may be used to update the abnormal process behavior identification.

One or more embodiments of the present invention provide a technological improvement over existing systems that require data analytics to be performed manually. A disadvantage of performing data analytics manually is the amount of time that it takes to perform the analytics which in turn limits the amount of data that can be analyzed. One or more embodiments of the present invention utilize PBA, machine learning and IT technical issue detection to automatically and systematically analyze the IT service data from a volume prospective, to detect technical issues, and to assist in root-cause analysis for technology service systems.

One or more embodiments of the present invention provide a technological improvement over existing systems that provide a manually entered and/or static list of recipients who should be notified when abnormal system behavior is detected. A disadvantage of a static list of recipients is that it requires a user to identify which SMEs should be notified when particular behavior is detected and to update the list when roles or interests of an SME changes. The process of updating the list can be untimely and error prone which may lead to delays in the correct person being notified on a technical issue. One or more embodiments of the present invention provide a light-weight interface that can be plugged in to different working environments, including but not limited to a user's email, chatting/instant message system or integrated development engine (IDE) for message delivery. The interface may also measure each user's interest by monitoring a number of mouse clicks and encouraging users to provide feedback. The recipient of an alert and/or the delivery method of the alert may be modified based on the feedback. In one or more embodiments of the present invention, the analytic models (both PBA and machine learning) are updated continuously following the evolution of the technology system and the client's business environment. In this manner, user feedback is used to extract domain knowledge from the SMEs and used to improve the analytic models. In addition, network traffic and storage resources may be saved by eliminating the sending of alerts to SMEs who indicate that they should not receive the alerts. Further, system availability and performance may be improved due to issues being addressed more quickly because the right person has been notified more quickly.

One or more embodiments of the present invention provide a technological improvement over existing systems by providing education to the SMEs based on the feedback from other SMEs. In this manner the system also has an educational role in a novel way and can improve the service quality by improving the average expertise level of the service team, or SMEs. Analyzed feedback may be selectively provided to the service team and formulated as micro-education/light-weight education modules through the feedback channel to make efficient use of a user's fragmented time In addition, one or more embodiments of the present invention enable cross-account issue detection based at least in part on the shared physical/virtual module of the system. For example, two accounts may share a soft layer (e.g., adapters, integrated service management system) and an issue identified from one client may result in or be caused by other clients that share the soft layer.

Further, one or more embodiments of the present invention train the machine learning model to determine alert recipients based at least in part on a user's technical background and portfolio. This initial trained machine learning model may be modified, or re-trained, based on feedback from the users.

One or more embodiments of the present invention automate the workload analysis process and speed up the technical issue detection for technology service teams by identifying anomaly patterns. In addition, manual efforts in technical health diagnosis are reduced. One or more embodiments of the present invention provide proactive service for issue detection and resolution, as well as technology service workload prediction. In addition, or more embodiments of the present invention provide service quality improvement by improving the average expertise level of service team. One or more embodiments of the present invention may be used in cognitive technology service management in applications such as, but not limited to: self-service delivery taxonomy; proactive technical health check; IT system risk assessment; IT service automation; staffing and shift optimization for incident resolution and change performance groups; and/or shorter technical issue identify-resolve cycle.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
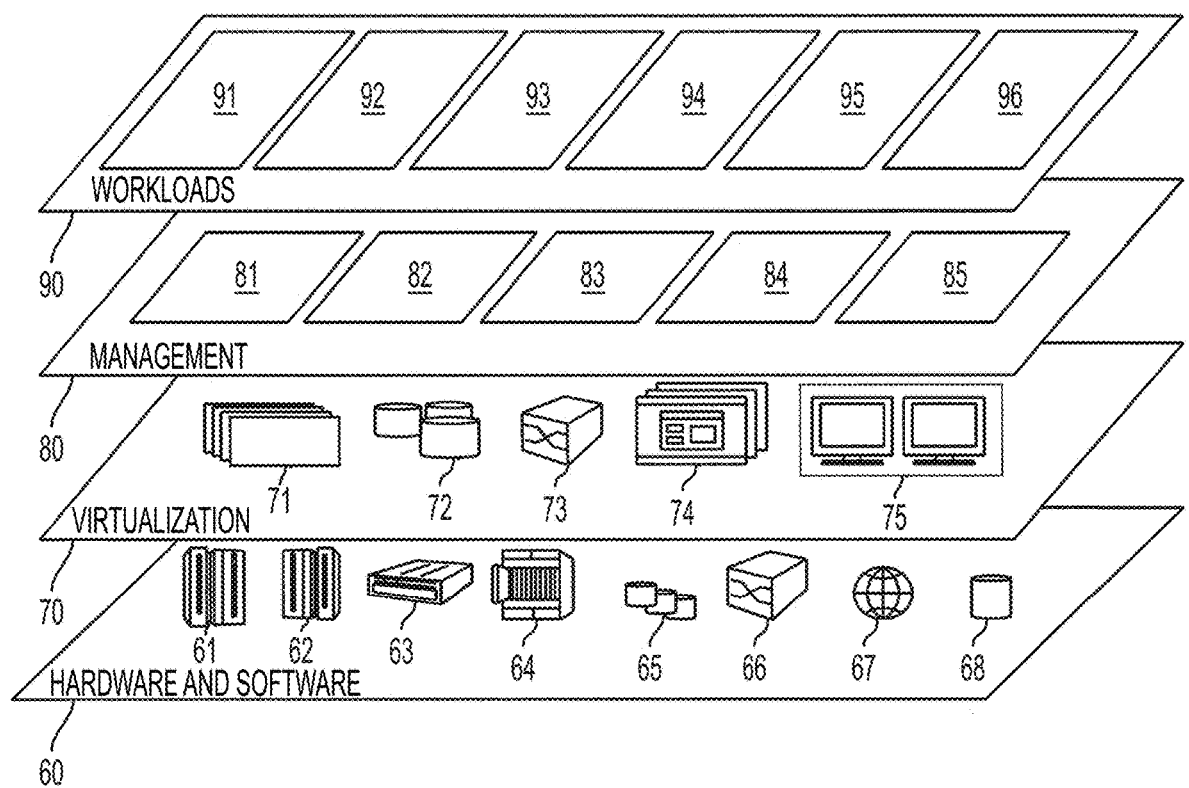
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and technical issue detection by PBA for information technology service workloads 96.

Figure 3:
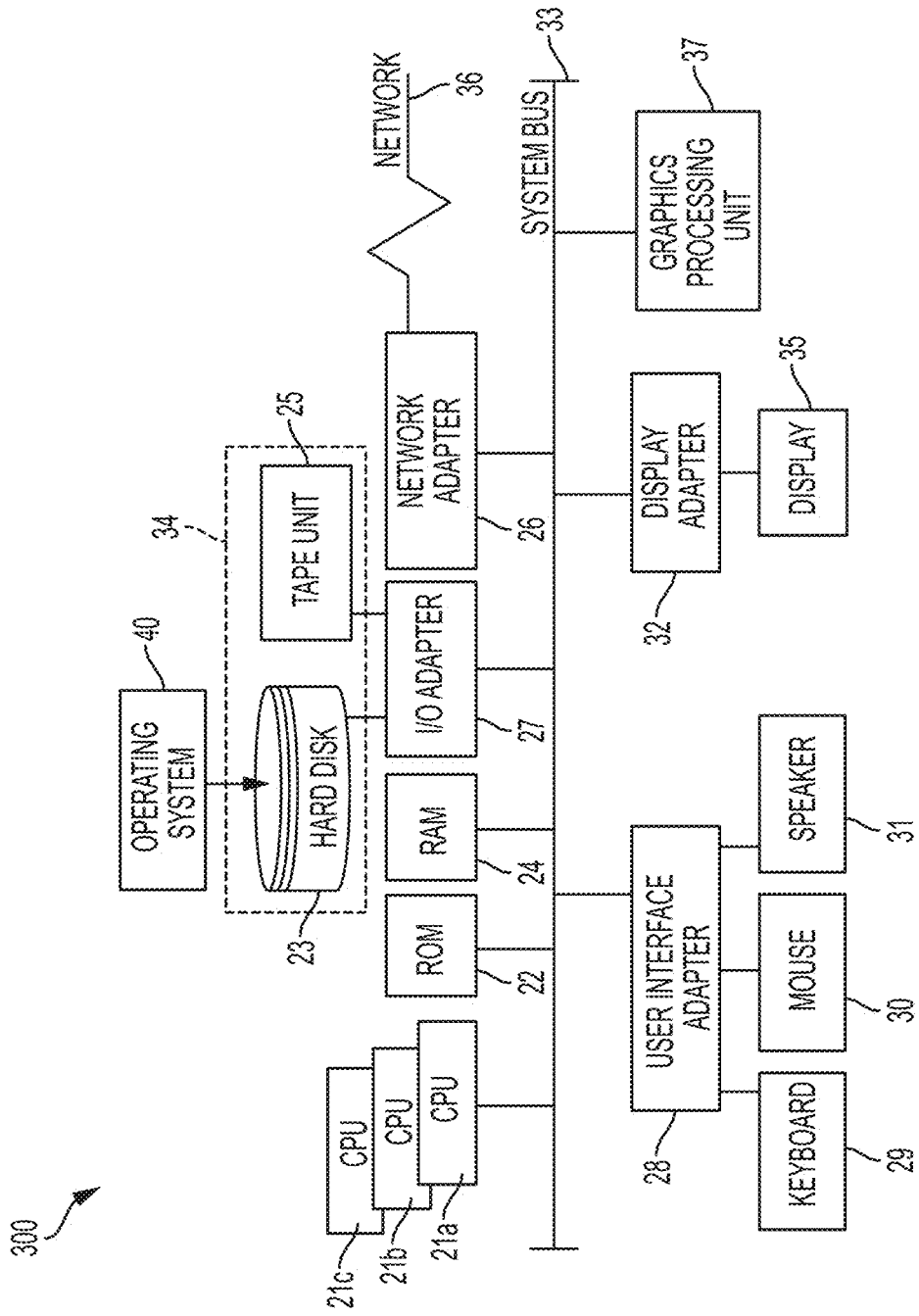
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21*a*, 21*b*, 21*c*, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
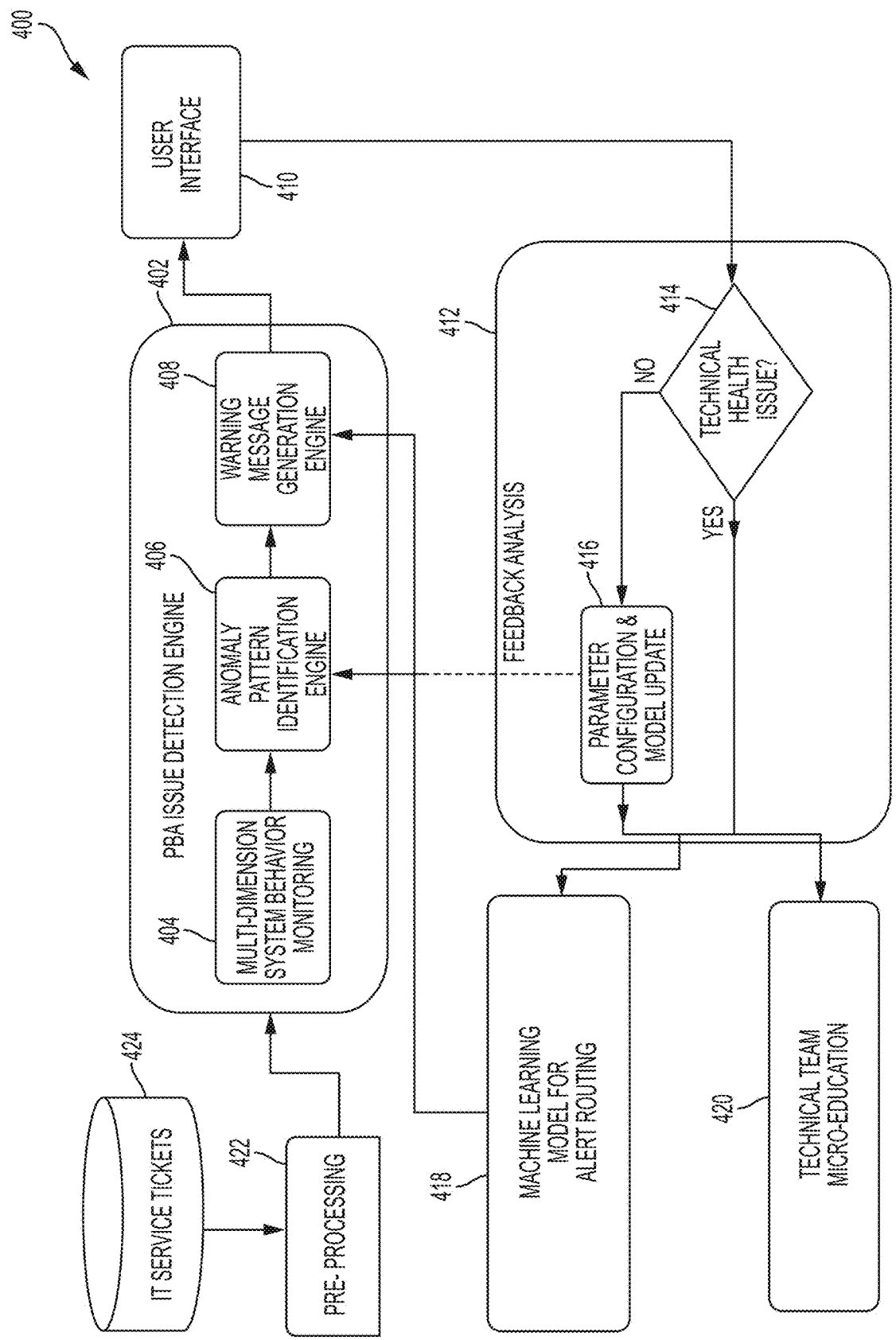
FIG. 4 depicts a block diagram of a system for information technology (IT) service monitoring according to one or more embodiments of the present invention.

Turning now to a more detailed description of aspects of the present invention, FIG. 4 depicts a block diagram of a system 400 for monitoring IT services according to one or more embodiments of the present invention. All or a subset of the system 400 shown in FIG. 4 may be implemented by one or more cloud computing nodes 10 and local computing devices 54A-N of FIG. 1. The system 400 shown in FIG. 4 includes IT service tickets 424 which are input to a pre-processing module 422 to generate key performance indicators (KPIs).

As used herein, the term "IT service ticket" refers to a report having to do with an IT system. An IT service ticket may contain data related to an incident (e.g., an outage) or a request (e.g., for a version upgrade or for a service visit). As used herein, "performance indicator" refers to a measurable value that demonstrates how effectively a company is achieving their business objectives. The performance indicators may be generated manually and/or automatically based on the IT service tickets 424. A "key performance indicator" or "KPI" is an example of one type of performance indicator that may be utilized by one or more embodiments of the present invention. Embodiments of the present invention are not limited to KPIs, as one skilled in the art will recognize that that other types of performance indicators may be used as measurable values to indicate how effectively a company is achieving their business objectives. An example of a KPI is the percentage of automatically-resolved tickets which helps a company track their performance in terms of process automation and can keep a check on whether the right process is automatically triggered for a specific task. Another example of a KPI is a percentage of tickets by ticket type. If the process behavior at an overall level doesn't show a significant deviation but tickets of a certain type show a sudden increase, it implies a possibility of an increased misclassification of tickets.

In accordance with one or more embodiments of the present invention, an IT service ticket 424 may be created for each unplanned interruption of one or more IT services. An IT service ticket 424 can be created manually by a user or automatically whenever a monitoring system detects an interruption of service. To measure the quality and efficiency of its incident management process, IT service providers may collect data for multiple clients in a single data warehouse. Any known method of extracting performance indicators from service tickets may be implemented by one or more embodiments described herein. In accordance with one or more embodiments of the present invention, the KPIs are known in advance and the pre-processing module 422 uses text analytics and natural language processing techniques to remove stopwords, perform lemmatization, case standardization and/or extract keywords related to the known KPIs from each ticket to generate individual KPI data points. In addition, text analytics may be used to classify a KPI into one or more dimensions (e.g., data point reflects a particular geographic region or a particular subset of products).

An example KPI may track a volume of incident tickets over time in order to detect any sudden or continuous changes in the volume of incident tickets over time. However, it is often not sufficient to just detect a change in overall incident ticket volume, as different SMEs are typically interested in different dimensions of the incident ticket volume change. For example, a delivery analyst may be interested in increases in high severity tickets, an automation expert in decreases in automatic resolution rates, a monitoring expert in increases in the number of manual tickets, and a data warehouse team in incidents that are due to data not being properly received. Thus, different SMEs are interested in different dimensions of the data.

As shown in FIG. 4, the KPIs are input to PBA issue detection engine 402 which includes a multi-dimensional system behavior monitoring module 404, an anomaly pattern identification engine 406, and a warning message generation engine 408. In an embodiment, the multi-dimensional system behavior monitoring module 404 continuously monitors KPIs generated from IT service ticket volumes broken down by various classification criteria to formulate a multi-dimensional time-series view of the process performance. Each time-series is screened by the anomaly pattern identification engine 406 to identify sudden or gradual deviations from normal behavior (e.g., fluctuations) which are sent to the warning message generation engine 408. The warning message generation engine 408 creates alert messages, determines a target user(s), and transmits the alert to an address of the target user(s) based at least in part on the machine learning module for alert routing 418. The phrase "machine learning" broadly describes a function of electronic systems that learn from data. A machine learning system, engine, or module can include a machine learning algorithm that can be trained to learn functional relationships between inputs and outputs that are currently unknown. Examples of machine learning models can include, for instance, support vector machines, linear regression, K-means, and various neural networks.

In accordance with one or more embodiments of the present invention, the targeted user receives the warning message at user interface 410. The warning message, or alert, may be in any form supported by the user interface 410, such as but not limited to an email message, a text message, an image or graphic, a haptic message, and/or an audio message. As shown in FIG. 4, feedback from the user is sent to feedback analysis module 412. The feedback analysis module 412 determines, based on contents of the feedback, at block 414 whether the user providing the feedback considered the alert to be related to a technical issue and whether the user providing the technical issue was in the expertise area of the user. If the feedback indicates that the alert was not related to a technical issue, then this data is input to the parameter configuration and model update module 416 which provides the feedback to the anomaly pattern identification engine 406. Based on the feedback, the PBA analytic module used by the anomaly pattern identification engine 406 may be updated. In accordance with one or more embodiments of the present invention, a user interface such as that shown below in FIG. 8 includes a check box for the user to indicate whether the alert was related to a technical issue, or system anomaly. Also as shown in FIG. 4, the user can indicate that the behavior indicated by the alert is caused by normal behavior or for an unknown reason. In other embodiments, where the user provides text feedback, text analytics may be used to extract this information.

If the feedback indicates that the alert was sent to the incorrect person, then this data is input to the parameter configuration and model update module 416 which provides the feedback to the machine learning model for alert routing 418. In accordance with one or more embodiments of the present invention, the machine learning model for alert routing 418 creates and maintains a machine learning model that is used to route alerts to users, such as SMEs. The machine learning model may be trained using alert (or anomaly pattern)/recipient pairs. Once trained, the machine learning model inputs an anomaly pattern and outputs an alert recipient(s). In an embodiment, the machine learning model inputs an alert and outputs an alert recipient(s). In this embodiment, key words related to an anomaly pattern may be extracted by the machine learning model using text analytics. The machine learning model is continuously updated, or retrained, with new alert (or anomaly pattern)/recipient pairs based on feedback from the users. The retraining may result in reaffirming that the correct recipient(s) has received the alert or in updating the recipient(s) of the alert. The machine learning model for alert routing module 418 may be integrated into the warning message generation engine 408. In addition, the feedback may be selectively provided to the service team and formulated as micro-education/light-weight education modules 420 for the users via, for example user interface 410.

As shown in the embodiment of FIG. 4, the IT service tickets 424 are pre-processed by pre-processing module 422 and fed to the PBA Issue detection engine 402. The PBA issue detection engine 402 has a large number of pre-defined KPIs (e.g., on the order of magnitude of hundreds or more) which it monitors to identify any anomalies. Warning messages are generated on the basis of the detected anomalies and passed on to the user interface 410. Over a period of time, feedback analysis module 412 learns the alerts which interest a user by monitoring the explicit and implicit feedback provided by the user. Explicit feedback can include things like subscription to a particular alert, while implicit feedback can include things like the user clicks and time spent looking at an alert. On the basis of the ground truth generated by feedback analysis module 412 for each user, the machine learning model for alert routing 418 creates an alert routing mechanism filtering out the alerts which a particular user is not interested in. The parameter configuration and model update module 416 performs parameter updates for this model to increase accuracy and adoption, and technical team micro-education module 420 generates education modules or messages to be communicated via the user interface 410.

An example incident management process implemented by one or more embodiments of the present invention follows. The example is provided as an aid in describing aspects of embodiments of the present invention and is not intended to be limiting. In the example process, there are incident tickets from over two-hundred clients and hundreds to thousands of IT service tickets are generated per client per week. In addition, the IT service tickets are classified into categories from different aspects including: automatic-generation, actionablilty, severity, pattern types, automatic-resolving, and service team, etc. System-level technical issues may be reflected by unusual behavior of ticket volumes for a particular category or multiple categories.

The use of contemporary methods to perform IT service monitoring includes receiving a client complaint when the performance of the IT system is below a desired level. In many cases, major incidents happen because of a complicated system-level issue(s), and manual efforts are taken by SMEs to investigate the complaint and to identify the underlying technical issues. Contemporary methods are contrasted with the use of one or more embodiments of the present invention that enable automatic real-time system-level monitoring by interacting with domain experts to help them quickly identify technical issues, and by providing the SMEs with data to support their diagnoses. In addition, example cases may be collected for further education of other team members as micro-education modules presented to users, for example, as a single graphic or sentence via a user interface. In one or more embodiments of the present invention, when the PBA issue detection engine 402 detects that the number of tickets indicating that a server is unavailable exceeds an upper control limit in a week and the mean value of the ticket volume exceeds an upper control limit in same week, an alert indicating that a system-level issue may exist that causes a server unavailable issue may be generated and sent to a technical support team member. By proactively identifying the issue and generating a warning message, the issue may be corrected before it becomes more severe.

In the example incident management process described herein multiple time series focusing on service request data are analyzed. Service requests may be used to track a problem from the time of its creation to its resolution and may be implemented, for example, by the IT service tickets 424 shown in FIG. 4. The service request in this example has many dimensions. These dimensions may be extracted from the service requests using the pre-processing module 422 of FIG. 4 to create KPIs for each dimension. In this example, a service request can be handled by a level 1 (L1) agent on the telephone, who can escalate the service request to a level 2 (L2) agent if the problem is complex. Either the L1 or the L2 agent may dispatch a field agent, or support service representative, for example if a part has to be replaced and the customer cannot perform the replacement. The L1 and L2 agents pick up work (e.g., a service request) from queues managed by technical support service ticketing systems.

Another dimension of a service request in this example is that hardware systems may be organized by sub-platforms (e.g., storage devices), and within each sub-platform there are several machine types, and within each machine type there may be many models. Another dimension of service requests in this example is that the L1/L2/SSR teams are organized by country, and a country is part of an integrated management team, which in turn is part of an integrated operations team.

Other dimensions may be based on the many metrics that can be associated with a service request such as, but not limited to: time spent by L1 agent, travel time by support service representative, and time spent (on site) by support service representative. Other metrics can include whether the call was resolved on the first attempt or was there a repeat call and what parts were replaced; and whether a part was shipped as a replacement part but returned as not needed (may indicate erroneous predicting of required replacement parts). A further dimension may be that a service request is associated with both a customer and an inventory record which defines the install address and an install time from which the machine's age can be computed.

In the example described herein, each time series involving service request counts is normalized, that is divided by the number of machines deployed along the dimensions of the query (e.g., country, machine type, customer, etc.). It is also assumed that each time series is a weekly time series for some time period T, such as fifteen months. The PBA focused categories described below may be created by multi-dimension system behavior monitoring module 404 of FIG. 4 and monitored by anomaly pattern identification engine 406 of FIG. 4.

Continuing with the example, a variety of categories that may be implemented follows. These categories are intended to be exemplary in nature and include just a few of the different types of categories that may be implemented as many more are possible. One PBA focused category in the example described herein includes the normalized (weekly) service request counts for machine type "2810" in sub-platform "XIV" across all integrated operation teams. In this example, the PBA issue detection engine 402 generates an issue alert if an anomalous pattern is detected in the service requests generated for machine type 2810 in sub-platform XIV across all integrated operation teams. The machine learning model is trained to send the issue alert to a lead service planner for machine type 2810 to investigate the root cause, followed by a per-country drill down. In one or more embodiments the alert is sent by warning message generation engine 408 of FIG. 4.

Another category in the example includes the weekly per-service request average handling time for machine type 2810, in two time series, France versus a Central Europe integrated management team, where average handling time is calculated as time spent by a L1 agent plus travel time by a service support agent plus time spent on site by the service support agent. If there are more anomalous data points for France versus Central Europe, then the machine learning model is trained to send alerts to a service planner for machine type 2810. In addition, an alert may be sent to the support team leads in France with an indication that there may still be a skill issue for machine type 2810 in France, causing longer debug times.

Another category in the example includes a repeat call metric for machine type 2810, with multiple time series, one per L1 agent queue in Germany. Anomalous repeat call indicators (e.g. showing too many repeat calls in some weeks) may indicate that the initial problem determination was inaccurate, and the machine learning model is retrained to send an alert to a lead of the L1 team who is monitoring the queue with the anomalous values. A sub-category compares the average repeat call counts between time series (e.g., L1 queues). An alert is sent to the lead of the L1 team who is monitoring the queue with the anomalous values. The implication may be that that particular team needs more training in debugging machine type 2810 problems.

Another PBA focused category in the example includes a normalized weekly service request time series for all integrated operations teams for machine type 2810 versus machine type 2812. If there are too many (e.g., over some threshold) anomalous points in machine type 2810 versus machine type 2812 or the average normalized weekly service requests across the entire time series is higher for machine type 2810, then the machine learning model is trained to send an alert to a service planner for machine type 2810. In addition, an issue alert may be sent to a product engineering team for machine type 2810 indicating that the new firmware release may have code errors.

An additional category in the example includes a parts-good-return ratio time series for sub-platform XIV, where country="US"; and one time series for customer "CUST X"; and another time series for all customers. A high parts-good-return ratio indicates that too many parts were returned as not needed, implying inaccurate planning for replacement parts. If the average metric value for CUST X in the US is higher than the count for all US customers, then the machine learning model is trained to send an issue alert to all support teams handling CUST X US service requests. In addition, an issue alert may be sent to a client-relation team for CUST X since the customer may be unhappy.

A further PBA focused category in the example includes the weekly failure rates of dual in-line memory modules (DIMMs) (based on parts-replaced data tied to service request data) in a particular computer server, and two time series: one for country=India, and the other for integration operations team=Asia-Pacific. A higher number (e.g., over a specified threshold number) of anomalies in the India time series compared to the Asia Pacific time series may indicate country-specific data center environment problems. In this case, the machine learning model is trained to send an alert to a technical support services delivery team that focuses on India.

A further category in the example includes the weekly failure rates of DIMMs in a particular computer server in India with two time series, one for customer CUST Y and the other for all customers in India. A higher number (e.g., over a specified threshold number) of anomalies in the time series for CUST Y versus all customers in India may indicate that there are data center environmental control issues for CUST Y. The machine learning model is trained to send an alert to the client relationship manager for CUST Y who in turn may contact the customer.

A further category in the example includes the weekly failure rates of DIMMs in a particular computer server for all integrated operations teams, with two time series, one for 300 gigabyte (GB) hard disk drive (HDD) part #1 and the other for 300 GB HDD part #2, both having an age of less than one year (e.g., determined from hardware inventory data). If part #1 has more failure rate anomalies than part #2, then the machine learning module is trained to send an issue alert to as service parts operations team indicating that part #2 may involve a manufacturing defect.

As described previously, the PBA focused categories described above are not intended to be limiting, as many other combinations of dimensions and time series may be implemented by one or more embodiments of the present invention.

Figure 5:
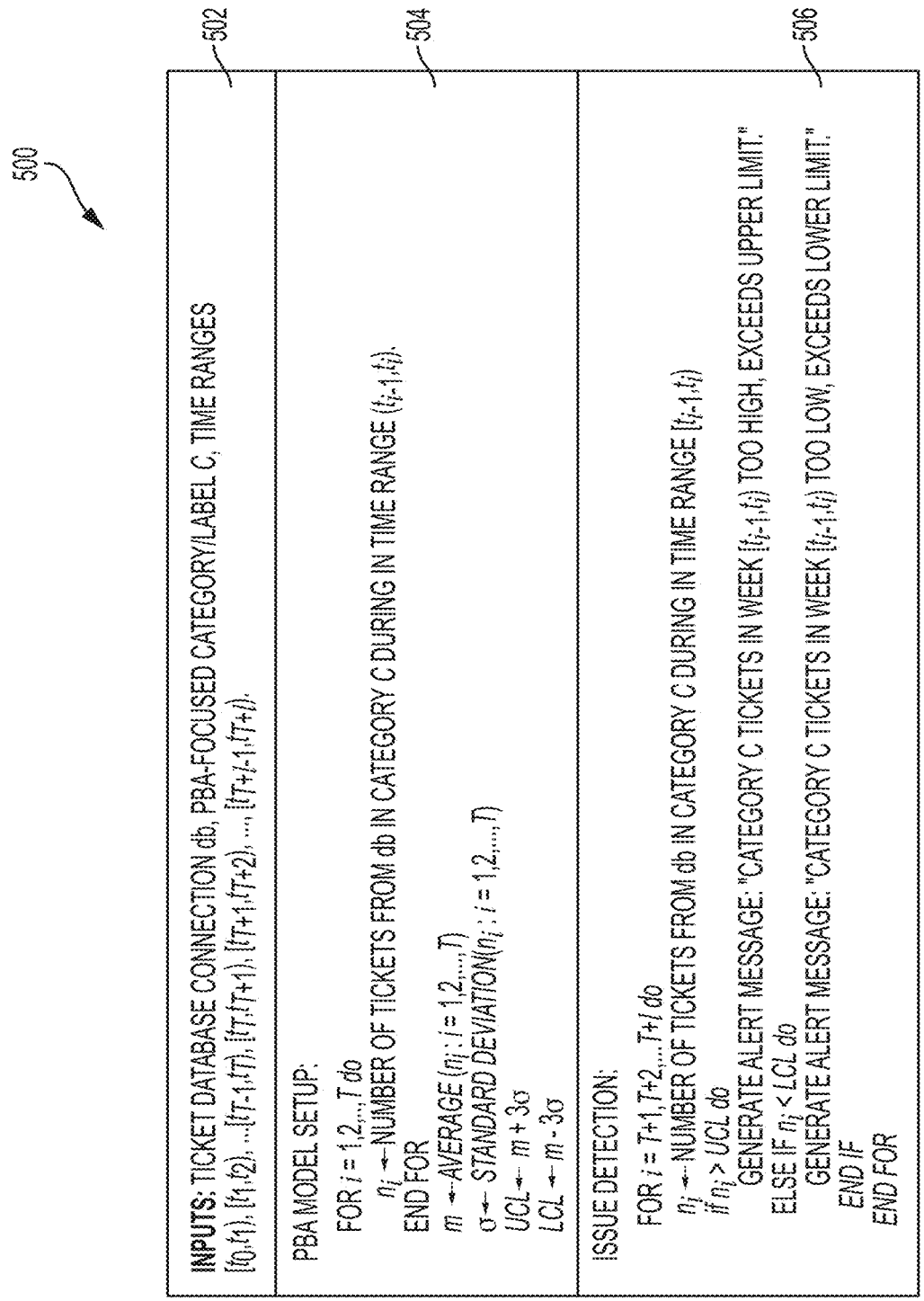
FIG. 5 depicts pseudo code for a process behavior analysis (PBA) issue detection engine according to one or more embodiments of the present invention.

Turning now to FIG. 5, pseudo code 500 for a PBA issue detection engine is generally shown according to one or more embodiments of the present invention. All or a subset of the processing performed by the pseudo code 500 shown in FIG. 5 may be performed, for example, by PBA issue detection engine 402 of FIG. 4. The pseudo code 500 shown in FIG. 5 is intended to be just one example of how the issue detection can be performed. One skilled in the art will recognize that a variety of other approaches and pseudo code arrangements can also be implemented to perform the processing described herein.

The processing shown in FIG. 5 may be performed for each PBA focused category ("C") for a specified time series ("T"). Block 502 shows inputs to the process including a connection to a database containing the IT service tickets, a PBA-focused category, and time ranges making up a time series. The PBA model is setup as shown in block 504 to calculate an average value, a standard deviation value, an upper control limit (UCL) value, and a lower control limit (LCL) value for each time range within the time series. All or a subset of the processing shown in block 504 may be performed, for example, by multi-dimension system behavior monitoring module 404 of FIG. 4. Block 506 of FIG. 5 shows an issue process that is used to determine whether a warning message, or issue alert, should be generated. All or a subset of the processing shown in block 506 may be performed, for example, by anomaly pattern identification engine 406 of FIG. 4.

Turning now to FIG. 6, pseudo code 600 for a machine learning model for feedback-based issue detection is generally shown according to one or more embodiments of the present invention. All or a subset of the processing performed by the pseudo code shown in FIG. 6 may be performed, for example by parameter configuration and model update module 416 of FIG. 4 in conjunction with machine learning model for alert routing 418 of FIG. 4. The pseudo code 600 shown in FIG. 6 is intended to be just one example and one skilled in the art will recognize that a variety of other approaches and pseudo code arrangements can also be implemented to perform the processing described herein.

As shown in block 602 of FIG. 6, inputs to the process include training data and test data. The training data includes $k_1$ warning messages with user feedback and $k_2$ warning messages without user feedback. The training data is used to generate the parameter estimates for the machine learning model and the test data is used to perform an out-of-sample validation to determine the prediction accuracy of the machine learning model. Block 604 shows an example of how to transform warning messages in set $W_{train}$ to a vector space of training data for training a machine learning model, such as machine learning model for alert routing 418 of FIG. 4. After transforming to vector space, a machine learning model is trained in block 604 to generate parameter estimates. Block 606 shows an example of how to transform warning messages in set $W_{test}$ to a vector space of test data for applying the learned machine learning model from block 604 to classify the $k_2$ warning messages into one of two categories: useful or suppressed.

Figure 7:
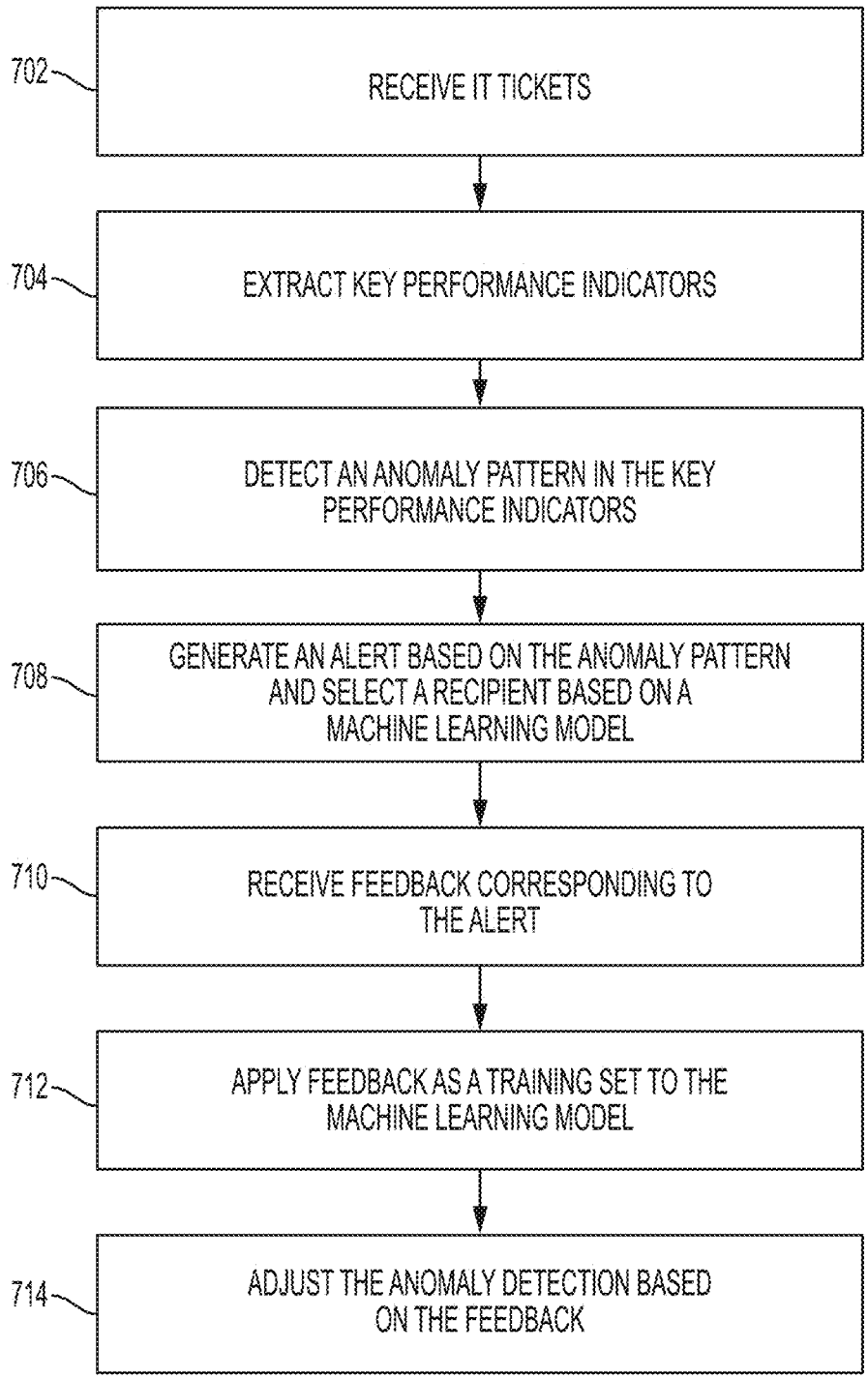
FIG. 7 depicts a flow diagram of a process for IT service monitoring according to one more embodiments of the present invention.

Turning now to FIG. 7, a flow diagram of a process 700 for monitoring IT services is generally shown according to one more embodiments of the present invention. All or a subset of the processing shown in FIG. 7 can be performed, for example, by system 400 of FIG. 4. At block 702, IT tickets describing incidents or requests are received. The IT tickets are processed at block 704 to extract KPI values from the IT tickets. At block 706, a statistical analysis of the KPI values is performed to detect an anomaly pattern in the KPI values. In accordance with one or more embodiments of the present invention, the performing of the statistical analysis includes formulating a multi-dimensional time-series view of the values of the performance indicator, and the anomaly pattern is identified based at least in part on the multi-dimensional time-series view exhibiting sudden or gradual fluctuations.

At block 708, an alert containing a warning message about the detected anomaly pattern is sent to an alert recipient(s) that is selected by a machine learning model trained to identify alert recipients based at least in part on identified anomaly patterns. At block 710, feedback about the warning message is received from the alert recipient. The feedback indicates an interest of the alert recipient in receiving warning messages about the detected anomaly pattern. The feedback may also include a suggested recipient in place of the alert recipient. At block 712, the machine learning model is updated based at least in part on the feedback. At bock 714, the anomaly detection is updated based at least in part on the feedback. The feedback may include whether the anomaly pattern represents a technical issue.

In accordance with one or more embodiments of the present invention, a message with educational content is sent to a plurality of recipients, including the alert recipient. The educational content is based at least in part on the feedback.

Figure 8:
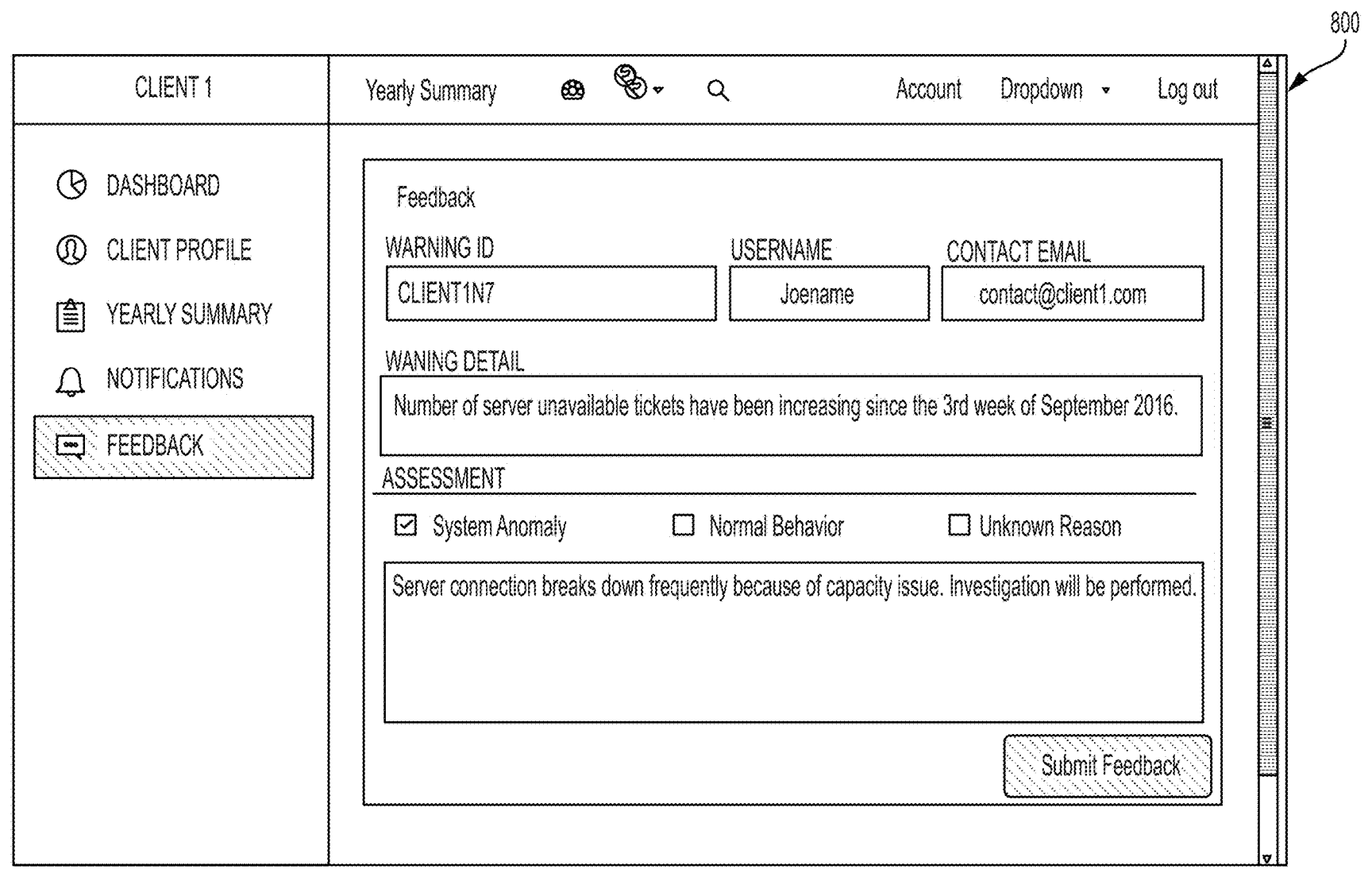

Turning now to FIG. 8, a user interface screen 800 for feedback collection is generally shown according to one or more embodiments of the present invention. FIG. 8 is provided as an example of user interfaces that may be utilized by exemplary embodiments of the present invention. Embodiments of the present invention are not limited to the user interfaces or the content of the user interfaces shown in FIG. 8, as one skilled in the art will recognize that other formats of user interfaces and content values may also be implemented.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, using a processor, a plurality of values of a performance indicator of an information technology (IT) system;
performing, using the processor, a statistical analysis of the plurality of values of the performance indicator to detect an anomaly pattern in the plurality of values of the performance indicator;
sending a warning message about the detected anomaly pattern to an alert recipient, the alert recipient remote from the processor and selected by a machine learning model trained to identify alert recipients based at least in part on detected anomaly patterns, wherein the machine learning model was trained based at least in part on a set of warning messages with user feedback that were transformed into a vector space and used for training the machine learning model to generate parameter estimates;
receiving feedback about the warning message from the alert recipient, the feedback including an interest of the alert recipient in receiving warning messages about the detected anomaly pattern, the interest of the alert recipient determined based at least in part on a number of mouse clicks and time spent viewing the alert by the alert recipient as measured by a computer interface coupled to a working environment of the alert recipient, the working environment comprising an integrated development engine (IDE); and
retraining the machine learning model based at least in part on the feedback, wherein subsequent to the retraining, the machine learning model selects a different alert recipient for at least one anomaly pattern.

2. The computer-implemented method of claim 1, wherein the feedback further including whether the detected anomaly pattern represents a technical issue, and the method further comprises updating the statistical quality control analysis based at least in part on the feedback.

3. The computer-implemented method of claim 1, wherein the statistical analysis is process behavior analysis and the indicators are key performance indicators.

4. The computer-implemented method of claim 1, wherein the values of the performance indicator are generated based at least in part on a plurality of IT tickets describing service incidents.

5. The computer-implemented method of claim 1, wherein performing the statistical analysis comprises formulating a multi-dimensional time-series view of the values of the performance indicator.

6. The computer-implemented method of claim 5, wherein the anomaly pattern is detected based at least in part on the multi-dimensional time-series view exhibiting sudden or gradual fluctuations.

7. The computer-implemented method of claim 1, further comprising sending a message with educational content to a plurality of recipients, the educational content based at least in part on the feedback.

8. A system comprising:
a memory having computer readable instructions; and
one or more processors for executing the computer readable instructions, the computer readable instructions controlling the one or more processors to perform operations comprising:
receiving a plurality of values of a performance indicator of an information technology (IT) system;
performing a statistical analysis of the plurality of values of the performance indicator to detect an anomaly pattern in the plurality of values of the performance indicator;
sending a warning message about the detected anomaly pattern to an alert recipient, the alert recipient remote from the one or more processors and selected by a machine learning model trained to identify alert recipients based at least in part on detected anomaly patterns, wherein the machine learning model was trained based at least in part on a set of warning messages with user feedback that were transformed into a vector space and used for training the machine learning model to generate parameter estimates;
receiving feedback about the warning message from the alert recipient, the feedback including an interest of the alert recipient in receiving warning messages about the detected anomaly pattern, the interest of the alert recipient determined based at least in part on a number of mouse clicks and time spent viewing the alert by the alert recipient as measured by a computer interface coupled to a working environment of the alert recipient, the working environment comprising an integrated development engine (IDE); and
retraining the machine learning model based at least in part on the feedback, wherein subsequent to the retraining, the machine learning model selects a different alert recipient for at least one anomaly pattern.

9. The system of claim 8, wherein the feedback further includes whether the anomaly pattern represents a technical issue, and the method further comprises updating the statistical quality control analysis based at least in part on the feedback.

10. The system of claim 8, wherein the statistical analysis is process behavior analysis and the indicators are key performance indicators.

11. The system of claim 8, wherein the values of the performance indicator are generated based at least in part on a plurality of IT tickets describing service incidents.

12. The system of claim 8, wherein performing the statistical analysis comprises formulating a multi-dimensional time-series view of the values of the performance indicator.

13. The system of claim 12, wherein the anomaly pattern is detected based at least in part on the multi-dimensional time-series view exhibiting sudden or gradual fluctuations.

14. The system of claim 8, wherein the operations further comprise sending a message with educational content to a plurality of recipients, the educational content based at least in part on the feedback.

15. A computer program product comprising a non-transitory computer readable storage medium having program instructions embodied therewith, the program instructions executable by a processor to cause the processor to perform operations comprising:
receiving a plurality of values of a performance indicator of an information technology (IT) system;
performing a statistical analysis of the plurality of values of the performance indicator to detect an anomaly pattern in the plurality of values of the performance indicator;
sending a warning message about the detected anomaly pattern to an alert recipient, the alert recipient remote from the processor selected by a machine learning model trained to identify alert recipients based at least in part on detected anomaly patterns, wherein the machine learning model was trained based at least in part on a set of warning messages with user feedback that were transformed into a vector space and used for training the machine learning model to generate parameter estimates;

receiving feedback about the warning message from the alert recipient, the feedback including an interest of the alert recipient in receiving warning messages about the detected anomaly pattern, the interest of the alert recipient determined based at least in part on a number of mouse clicks and time spent viewing the alert by the alert recipient as measured by a computer interface coupled to a working environment of the alert recipient, the working environment comprising an integrated development engine (IDE); and retraining the machine learning model based at least in part on the feedback, wherein subsequent to the retraining, the machine learning model selects a different alert recipient for at least one anomaly pattern.

16. The computer program product of claim 15, wherein the feedback further includes whether the anomaly pattern represents a technical issue, and the method further comprises updating the statistical quality control analysis based at least in part on the feedback.

17. The computer program product of claim 15, wherein the statistical analysis is process behavior analysis and the indicators are key performance indicators.

18. The computer program product of claim 15, wherein the values of the performance indicator are generated based at least in part on a plurality of IT tickets describing service incidents.

19. The computer program product of claim 15, wherein performing the statistical analysis comprises formulating a multi-dimensional time-series view of the values of the performance indicator.

20. The computer program product of claim 15, wherein the operations further comprise sending a message with educational content to a plurality of recipients, the educational content based at least in part on the feedback.

* * * * *